Figure 1:
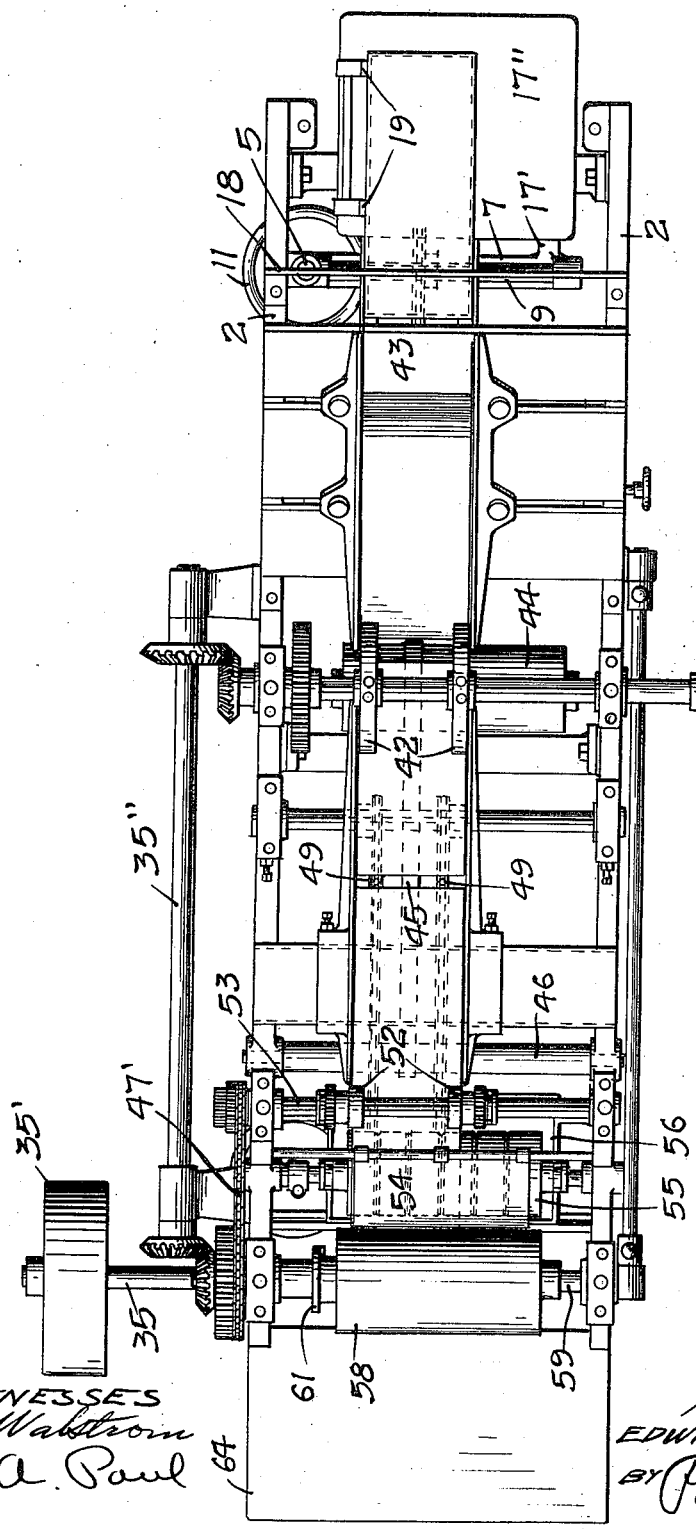

E. G. STAUDE.
AUTOMATIC PAPER BOX TOPPING MACHINE.
APPLICATION FILED JULY 22, 1912.

1,134,562.

Patented Apr. 6, 1915.
4 SHEETS—SHEET 1.

WITNESSES
A. M. Wahlstrom
E. A. Paul

INVENTOR
EDWIN G. STAUDE
BY Paul & Paul
ATTORNEYS

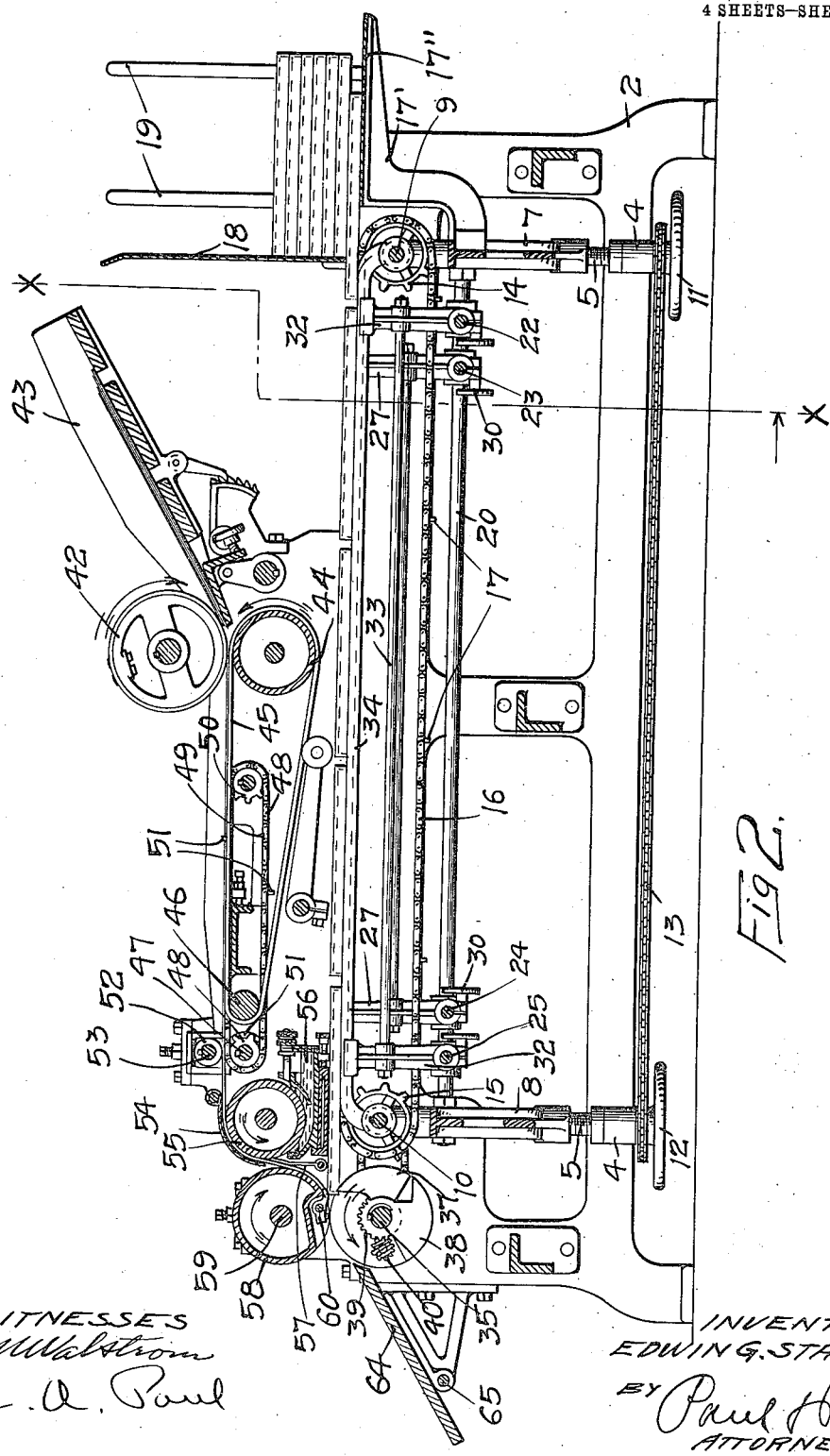

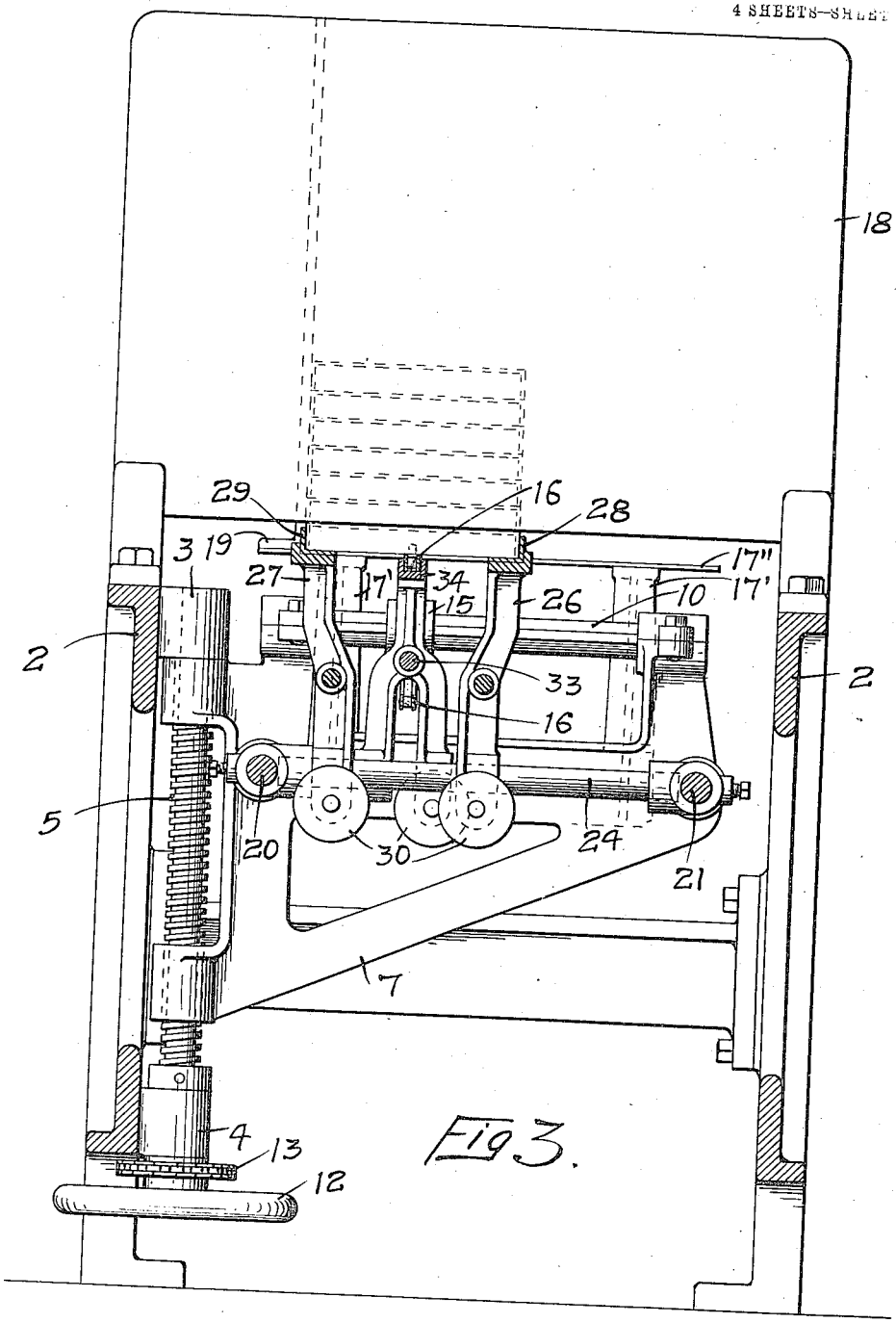

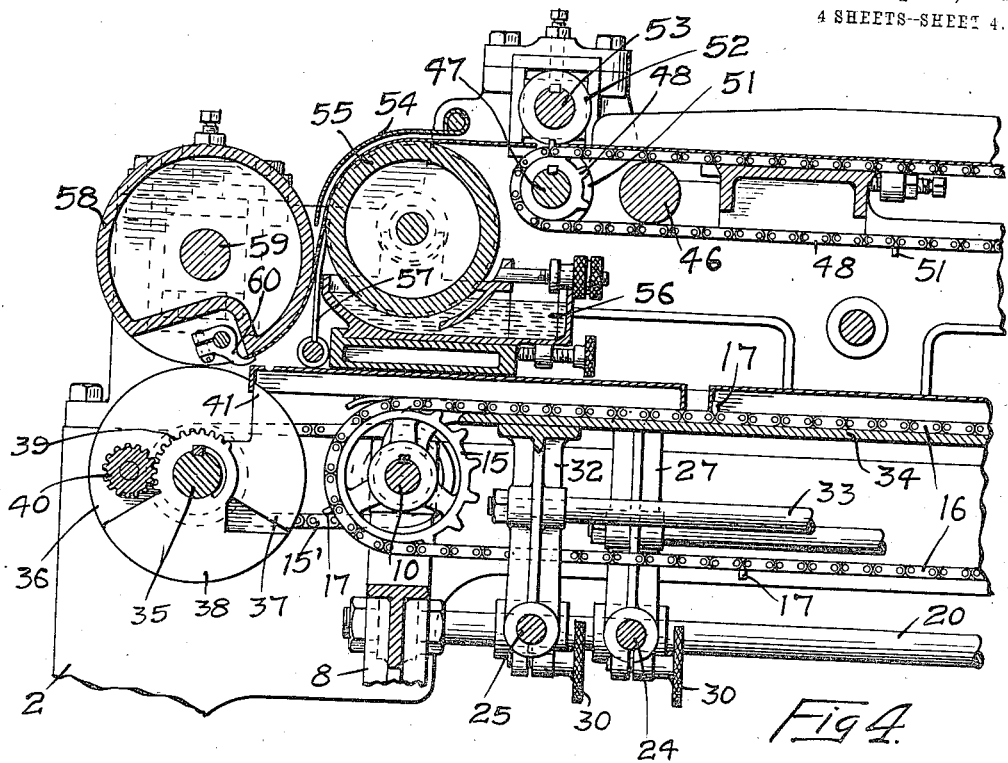

UNITED STATES PATENT OFFICE.

EDWIN GUSTAVE STAUDE, OF MINNEAPOLIS, MINNESOTA, ASSIGNOR TO E. G. STAUDE MANUFACTURING CO., OF MINNEAPOLIS, MINNESOTA, A CORPORATION.

AUTOMATIC PAPER-BOX-TOPPING MACHINE.

1,134,562.            Specification of Letters Patent.        Patented Apr. 6, 1915.

Application filed July 22, 1912. Serial No. 711,001.

*To all whom it may concern:*

Be it known that I, EDWIN G. STAUDE, of Minneapolis, Hennepin county, Minnesota, have invented certain new and useful Improvements in Automatic Paper-Box-Topping Machines, of which the following is a specification.

The primary object of my invention is to provide a machine which will automatically paste plain or printed sheets or labels on paper box covers and the like.

A further object is to provide a machine which can be quickly adjusted for different sizes of work.

A further object is to provide a machine of simple construction which can be easily kept in order and will require but little experience to operate.

The invention consists generally in various constructions and combinations, all as hereinafter described and particularly pointed out in the claims.

In the accompanying drawings forming part of this specification, Figure 1 shows the plan view of the automatic topping machine embodying my invention, Fig. 2 is a vertical section thereof, Fig. 3 is a cross section on the line $x$—$x$ of Fig. 2, looking in the direction of the arrow, Fig. 4 is an enlarged sectional view of the rear portion of the machine, Fig. 5 is an elevation of the sheet or label and work receiving cylinders, Fig. 6 is an end view, partially in section, of the cylinders, showing a cover passing between them.

In the drawing, 2 represents a suitable frame in which the operating mechanism of the machine is mounted. The side rails of said frame on one side of the machine are provided with inwardly projecting lugs 3 and 4, preferably integral with the frame, having bearings for upright screw shafts 5. (See Figs. 2 and 3.) On these screw shafts yokes 7 and 8 are mounted and arranged to project into the space between the side rails of the frame, as shown in Fig. 3, and having bearings for parallel, transverse shafts 9 and 10. (See Fig. 2.) These yokes and shafts are adjusted vertically on the upright screws by means of the operating wheels 11 and 12. The upright screw shafts 5 are connected by a sprocket chain 13 which passes over suitable sprockets secured to said upright shafts and by revolving either of the hand wheels 11 or 12 the upright screw shafts will be operated simultaneously to raise or lower the transverse shafts 9 and 10.

Mounted on the shafts 9 and 10 are sprocket wheels 14 and 15. A sprocket chain 16 passes around the sprockets 14 and 15 and has lugs 17 thereon to engage and feed the work, as will hereinafter appear. Brackets 17' are mounted on the yoke 7 at the forward end of the machine and support a plate 17'' which forms the bottom of a hopper. A plate 18 is secured to the frame 2 and forms the rear wall of the hopper and adjustable guides 19 are provided at the sides of the hopper for holding the box covers or other work in proper position on the supporting plate 17''. The yokes 7 and 8 are preferably connected with one another by horizontal parallel rods 20 and 21, and between these rods at suitable intervals I provide cross shafts 22, 23, 24 and 25. Brackets 26 and 27 are mounted on the cross shafts 23 and 24 and support angle bars 28 and 29. The horizontal flanges of these angle bars serve as a table or way over which the work is fed and the vertical flanges of said bars form side guides for the work. The brackets are adjusted transversely of the machine on the shafts 23 and 24 by suitable clamp devices 30, by means of which the distance between the angle bars 28 and 29 may be varied to accommodate different widths of box covers or other material that is fed through the machine. Brackets 32 are mounted on the shafts 22 and 25 and are connected to one another by a rod 33 and support a channel bar 34 located intermediate to the brackets 26 and 27. (See Figs. 2 and 3.) The ends of the channel bar 34 are curved downwardly and fit into annular grooves in the hubs of the sprockets 14 and 15, thereby holding the channel bar in line with the sprockets at all times and insuring a true, uniform movement of the chain 16. The sprocket wheel 15 is splined on the shaft 10 and adapted to slide thereon, but revolves continuously with the said shaft and has a belt 15' connecting it with a shaft 35. The shaft 35 supports a work receiving cylinder or member 36 which is composed of sections 37 and 38. This receiving member 36 is preferably constructed as follows: The sections 37 are keyed to the shaft 35 and the sections 38 are free to turn thereon and have a portion thereof cut away to allow the key of the section 37 to be made in the form of a continuous bar and hold all parts of the sections 37 on the shaft 35 while permitting the adjustment of the sections 38. The section 38 has teeth 39 near its hub, meshing with a comparatively long pinion 40. The rotation of this pinion will move the section 38 and increase or decrease the distance between its rear portion and the forward portion of the section 37. The peripheral area of the sections 37 and 38 is substantially the same and the section 38 may be rotated in one direction to register or coincide with the sections 37 or in the opposite direction to separate the sections and provide a peripheral surface equal to the combined peripheral area of both sections. (See Fig. 4.) The section 37 has a toe or point 41 that is adapted to engage the forward flange of a box cover and feed the cover forward between the part 37 and the label receiving cylinder or member above. The rotary adjustment of the part 38 is easily and quickly accomplished through the medium of the pinion 40, which has a squared end to receive an operating tool. (See Figs. 4, 5 and 6.) The plate 18 is spaced from the ways beneath a sufficient distance to allow a cover to be fed out from the bottom of the pile in the hopper upon the engagement of one of the feed pins with the forward flange of the cover, as indicated in Figs. 2 and 3, upon the engagement of a pin with the cover to be fed forward upon the angle bars 28 and 29 to the sheet or label applying mechanism, which I will now proceed to describe in detail.

Above the feeding mechanism for the covers I arrange a feed wheel 42 in position to engage and feed a sheet or label from the hopper 43. A drum 44 is located beneath the wheel 42 and has belts 45 and an idle roll 46. The movement of the wheel 42 operates to feed a sheet or label between it and the drum 44.

47 is a shaft mounted in suitable bearings and having sprockets 48 over which chains 49 operate. An idler 50 is arranged to take up the slack of the chain and the wear of the machine. Pins 51 are mounted on the sprocket chains 49.

The wheel 42 is arranged to draw one sheet or label from the hopper with each revolution and deliver it to the belts 45, which operate at a greater speed than the pins 51 so that the forward edge of the sheet or label will strike the pins 51 and be held in contact therewith as the said pins move toward the rear of the machine. The movement of the pins is timed to allow the sheets or labels to pass between the feed rolls 51 on the shaft 47 and rolls 52 on a shaft 53 arranged above the shaft 47. When the sheet or label passes between these rolls it will be fed forward positively between them into contact with a curved deflector 54, which operates to bend the forward portion of the sheet or label downwardly upon the gumming roll 55. This roll 55 operates in a suitable receptacle 56 which is adapted to contain an adhesive agent in liquid form for application to the surface of the gumming roll.

I prefer to provide strippers 57, preferably of wire, located near the deflector 54 and operating to strip the sheets or labels from the gumming roll and near these strippers is a sheet or label receiving cylinder 58 revolving with the shaft 59 and having a gripper device 60 to grasp the forward end of the sheet or label and draw it against the surface of the cylinder 58 and move it downwardly for application to the work.

The gripper device is operated by a suitable cam mechanism 61, which is adjustably secured to the frame of the machine, concentric with the shaft 59. The spring 62 holds the gripper device in yielding contact with the cam 61. The cam 61 is cut away at the point 63 to open the gripper just prior to the time that the work and the sheet or label pass the center line between the two cylinders. This gripper device may be modified in various ways and any other suitable equivalent mechanism may be employed in place of it to grasp the sheet or label and feed it forwardly into registering relation with the box cover. The sheet or label being drawn toward the periphery of the cylinder 58 and the covers or other material being fed forward, the sheet or label will be applied to the flat upper surface of the cover as the sheet or label and the cover pass between the rolls, the side flanges of the cover passing between the sections 37 and 38, which previously have been adjusted to receive a box cover of the length then in the machine. A table 64 is pivoted at a point 65 and adapted to be tilted back to permit easy access to the work cylinder for adjusting purposes.

A separator device 66, (see Figs. 5 and 6) is arranged between the sections 37 and 38 to provide space for the side flanges of the cover. An adjusting nut 67 is arranged to bear against the head 36 of the work cylinder to clamp the sections of the cylinder against a second head 68 that is secured on the shaft by means of a set screw 68'. This head 68 will remain stationary and lateral adjustment of the sections will be accomplished by releasing the nut 67 and arranging the separator or spacer between the sections to separate them sufficiently to receive the side flanges of the cover. The shaft 47 and the roll 55 have a driving connection 47' with the shaft 35, as illustrated in Fig. 1. The shaft 35 extends outwardly beyond the side of the machine and has a pulley 35' thereon and an operating shaft 35'' is geared to the shaft 35 and to the shaft of the feed wheel 42.

The sheet that is affixed by this machine to the box cover may be either plain or printed. In the latter case it will be appropriately designated as a label. The operation of the machine is, of course, the same, whether the sheet that is affixed to the box cover or other article is plain or has inscriptions thereon. While the sheets are usually of paper it is obvious that they may be of cloth or other suitable, flexible material. The sheets and the articles to which they may be affixed may be of any suitable size within the range of adjustment of the machine.

I do not limit myself to the details of construction herein shown and described, as it is obvious that the same may be varied in many particulars without departing from my invention.

I claim as my invention:—

1. A box topping machine comprising a hopper to contain flanged covers, a traveling carrier provided with means to engage the inner face of the forward flange of the lowermost cover in the hopper and feed it forwardly, guides for the covers extending from the hopper to a point adjacent sheet affixing means and lying on opposite sides of the traveling carrier, sheet carrying means disposed above the cover carrier, adhesive applying means located adjacent to the sheet affixing means and the delivery points of the cover and sheet carrying means, and sheet affixing means including presser members located beyond the delivery points of the cover and sheet carrying means and adjacent to the adhesive applying means.

2. The combination, with a hopper adapted to receive flanged box covers placed one above another therein, of feeding means disposed in relation to the inner face of the forward flange of the cover and adapted to feed the cover outwardly from beneath the pile in said hopper, a sheet feeding means, a gumming device therefor, the feeding means for said cover and sheet being timed to register the sheet with the cover, and means for pressing the sheet on the top of the cover.

3. The combination, with a hopper adapted to receive a series of flanged covers placed one above another therein and having an upright wall and a space beneath said wall through which the bottom cover of the pile may be fed, means engaging the inner face of the forward flange of the bottom cover to feed it outwardly from said hopper, a sheet feeding means, a gumming device for said sheet, said feeding means being timed to register the sheet with the top of the cover at a predetermined point in the operation of the machine, and means for pressing the sheet on the top of the cover.

4. The combination, with a hopper adapted to receive a series of flanged box covers placed one above another therein, of a feed belt having lugs at intervals thereon and disposed in relation to the hopper to have the lugs engage the forward depending flange of the bottom cover of the pile and feed it outwardly from said hopper, means for feeding a sheet, means for gumming the sheet, the movement of said belt and said sheet feeding means being timed to register the sheet with the top of the cover, and means for pressing the sheet on the cover.

5. The combination, with a hopper adapted to receive flanged box covers placed one above another therein, of feeding means disposed in relation to the inner face of the forward flange of the bottom cover of the pile and adapted to feed said cover from said hopper, guides provided on each side of said cover extending from the hopper to a point adjacent to a label affixing means, a sheet feeding means, a gumming device therefor, said feeding means being timed to register the sheet with the top of the cover, and means for pressing the sheet on the cover.

6. The combination, with a hopper adapted to receive flanged box covers placed one above another therein, of angle bar guides between which the covers are fed, and extending from the hopper to a point adjacent to a label affixing means, means arranged between said guides to engage the inner face of the forward flange of the bottom cover of the series and adapted to feed said cover outwardly from said hopper, a sheet feeding means, a gumming device therefor, said feeding means being timed to register the sheet with the top of said cover, and means for pressing the sheet on the cover.

7. The combination, with a hopper adapted to contain a series of flanged box covers arranged one above another therein, of angle bar guides between which the bottom cover of the series is fed, means for adjusting said guides transversely to adapt them for receiving and guiding box covers of different widths, means disposed between said guides and arranged in relation to the hopper to engage the inner face of the forward flange of the cover for feeding the box covers, one at a time, a sheet feeding means, a gumming device therefor, said feeding means being timed to register the sheet with the top of the cover, and means for pressing the sheet on the cover.

8. The combination, with a frame, of yokes mounted therein, a hopper carried by one of said yokes, a feeding means also carried by said yokes, means for adjusting said hopper and said feeding means vertically and simultaneously, a sheet feeding means, a gumming device, said sheet feeding means being timed to register the sheet with the work fed from said hopper, and means for pressing the sheet on the work.

9. The combination, with a frame, of upright screw shafts mounted therein, yokes mounted on said shafts and vertically adjustable thereon, a hopper carried by one of said yokes, a feeding means carried by said yokes and vertically adjustable therewith and with said hopper, a sheet feeding means and a gumming device therefor, said sheet feeding means being timed to register the sheet with the work from said hopper, and means for affixing a sheet to the work.

10. The combination, with means for feeding a sheet, and means for feeding a flanged cover to which the sheet is to be affixed, said feeding means being timed to register the sheet with the cover at a predetermined point in their movement, means for gumming the sheet, and coöperating means for receiving the cover and sheet and pressing them together, one member of said coöperating means being constructed in sections and arranged to lie within the flanged cover in applying the sheet.

11. The combination, with means for feeding a sheet, and means for feeding a flanged cover to which said sheet is to be affixed, said means being timed to register the sheet with the cover, of a gumming device for the sheet, a cylinder adapted to receive the gummed sheet, and a second cylinder coöperating with the first named cylinder and between which cylinders the sheet and the flanged cover are fed, one of said cylinders being composed of sections disposed to lie within the flanged cover in the operation of affixing the sheet.

12. The combination, with means for feeding a sheet, and means for feeding a flanged cover to which it is to be affixed, said means being timed to register the sheet with the cover, of a gumming device for the sheet, a member adapted to receive the gummed sheet, and a second member coöperating with the first named member, and between which members the sheet and the flanged cover are fed, one of said members being composed of sections disposed to lie within the flanged cover in the operation of affixing the sheet.

13. The combination, with means for feeding a sheet, and means for feeding the article to which said sheet is to be affixed, of a gumming device for the sheet, members whereto the sheet and the article are delivered, one of said members being composed of adjustable sections having spaces to receive portions of the article to which the sheet is to be affixed.

14. The combination, with means for feeding a sheet, and means for feeding the article to which the sheet is to be affixed, of a gumming device, members whereto the sheet and article are delivered to be united one to the other, one of said members being composed of a series of sections, some of said sections having an adjustment with respect to the other sections to adapt the member for articles of different sizes.

15. The combination, with means for feeding a sheet, and means for feeding the article to which the sheet is to be affixed, of a gumming device for the sheet, cylinders whereto the sheet and article are delivered, one of said cylinders being composed of adjustable sections having circumferentially formed spaces to receive portions of the article to which the sheet is affixed.

16. The combination, with means for feeding a sheet and means for feeding the article to which the sheet is to be affixed, of a gumming device for the sheet, cylinders whereto the sheet and article are delivered, one of said cylinders being composed of a series of segmental disks.

17. The combination, with means for feeding a sheet and means for feeding the article to which the sheet is to be affixed, of a gumming device, cylinders whereto the sheet and article are delivered, one of said cylinders being composed of a series of sections, some of said sections having a rotary adjustment with respect to the other sections to adapt the cylinder for articles of different length.

18. The combination, with means for feeding a sheet, of means for feeding a flanged box cover, means for gumming the sheet, the movement of said feeding means being timed to register the sheet with the top of the cover, means for receiving the sheet and cover and pressing them together, said pressing means having a surface capable of expansion or contraction to adapt it for covers of different sizes and provided with spaces to receive flanges of the covers.

19. The combination, with means for feeding a sheet and means for feeding a flanged cover, the movement of said feeding means being timed to register the sheet with the cover, means for gumming the sheet, coöperating members whereto the sheet and cover are delivered, one of said members having a peripheral surface adapted to bear on the inner surface of the cover top and also having means to receive the cover flanges and the other member operating to press the label on the cover during its passage between the members.

20. The combination, with means for feeding the sheets and means for feeding flanged covers thereto, said feeding means being timed to register the labels with the top of the covers, means for gumming the labels, coöperating members whereto the labels and covers are delivered, one of said members being composed of a series of sections, the alternate sections being stationary and the others having a movement on said member, and means for adjusting them to increase or decrease the peripheral area of said member to adapt it for covers of different sizes.

21. The combination, with means for feeding the flanged covers and means for feeding the sheets, of coöperating members whereto the covers and sheets are delivered, one of said members being composed of a series of sections, means separating said sections from one another to allow a space between them to receive the flanges of said cover, the movement of said feeding means being timed to register the sheets with the covers and said members coöperating to press the sheets on the covers.

22. The combination, with means for feeding the sheets and means for feeding the article to which the sheets are to be affixed, of coöperating members, said feeding means being timed to register the sheets with the articles to which the sheets are to be affixed, one of said members being composed of a series of sections, some of said sections being loosely mounted and having teeth thereon and a pinion meshing with said teeth and operating to rotate said loosely mounted sections to increase or decrease the length of the peripheral bearing surfaces of said section.

In witness whereof, I have hereunto set my hand this 19th day of July, 1912.

EDWIN GUSTAVE STAUDE.

Witnesses:
GENEVIEVE E. SORENSEN.
EDWARD A. PAUL.